Figure 1:
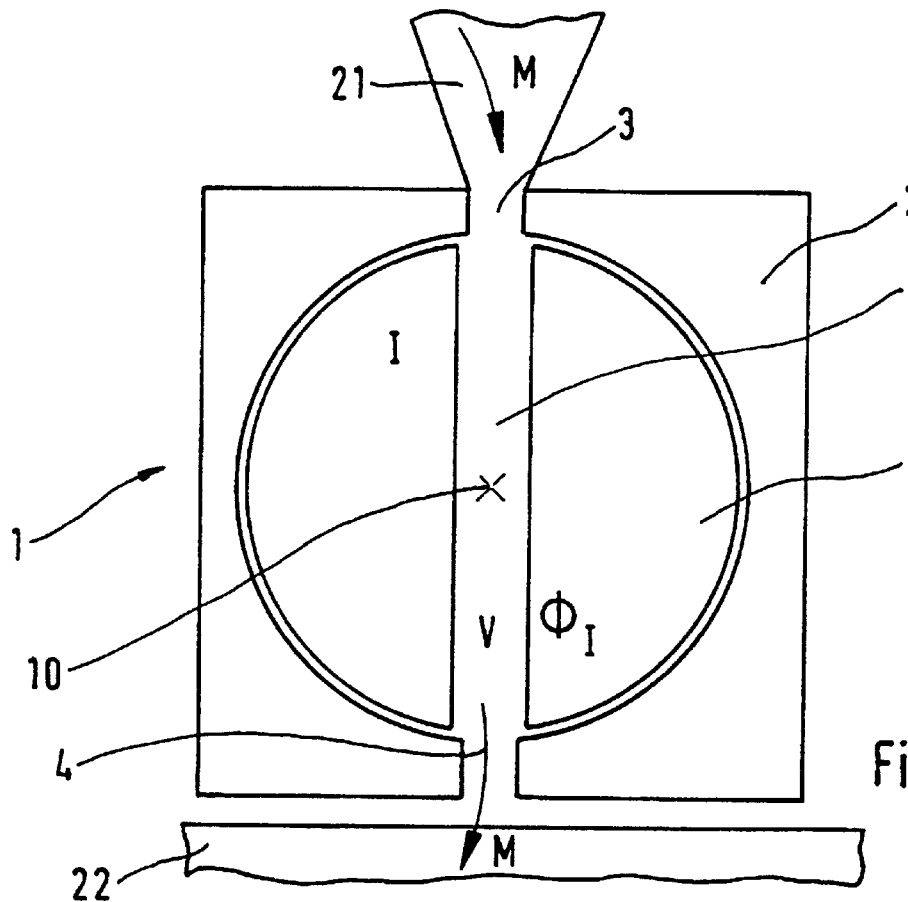

United States Patent [19]
Ruiz et al.

[11] Patent Number: 6,116,474
[45] Date of Patent: Sep. 12, 2000

[54] METERING VALVE AND METHOD FOR THE METERED DELIVERY OF PASTY MEDIUMS

[75] Inventors: Jesus Ruiz, Le Mont-sur-Lausanne, Switzerland; Yves Gruau, Champagnes, France

[73] Assignee: Sicpa Holding S.A., Prilly, Switzerland

[21] Appl. No.: 09/147,655

[22] PCT Filed: Jun. 12, 1998

[86] PCT No.: PCT/EP98/03540

§ 371 Date: Feb. 9, 1999

§ 102(e) Date: Feb. 9, 1999

[87] PCT Pub. No.: WO98/58201

PCT Pub. Date: Dec. 23, 1998

[30] Foreign Application Priority Data

Jun. 16, 1997 [EP] European Pat. Off. .............. 97810378

[51] Int. Cl.[7] .............................. G01F 11/20; B67B 7/00; E03B 65/20

[52] U.S. Cl. .......................... 222/410; 222/1; 137/624.13; 137/624.15

[58] Field of Search ................................ 222/1, 477, 410; 137/624.13, 624.14, 624.15

[56] References Cited

U.S. PATENT DOCUMENTS

| | | | |
|---|---|---|---|
| 2,197,610 | 4/1940 | Fedeler, Jr. ...................... | 137/624.13 X |
| 2,880,760 | 7/1959 | Widell et al. ................... | 137/624.15 X |
| 3,937,252 | 2/1976 | Ishida ................................. | 137/624.13 |
| 4,200,122 | 4/1980 | Miskin .......................... | 137/624.15 X |
| 4,210,169 | 7/1980 | Palma ............................. | 137/624.13 X |
| 5,148,946 | 9/1992 | Mizuta et al. .............................. | 222/1 |

*Primary Examiner*—Kevin Shaver
*Assistant Examiner*—D A Bonderer

[57] ABSTRACT

A metering valve for delivering pasty mediums includes a valve housing having an inlet opening and an outlet opening, with a variable flow restrictor therebetween. The flow restrictor has one or more holes for connecting the inlet opening to the outlet opening. At least one hole can be intermittently placed between the inlet and the outlet to reduce the effective cross section of the hole.

9 Claims, 5 Drawing Sheets

METERING VALVE AND METHOD FOR THE METERED DELIVERY OF PASTY MEDIUMS

The invention relates to a metering valve and a method for metering preferably pasty mediums.

Many different types of valves are employed for the metered delivery of fluids. Differing requirements must be fulfilled, depending on the field of application and the type of medium to be delivered. Above all it is important that on the one hand, a large discharge of the medium to be delivered is possible, and on the other hand, on reaching the desired amount, the discharge amount can be so heavily reduced that an exact metering is possible. Above all, with pasty mediums it is difficult to meet both these conditions together.

For example, in GB-A-2139322 a lifting valve is known with which the discharge rate may be reduced by an oscillating movement of the valve lifter. The valve according to GB-A-2139322 however is not at all suitable when applied for metering pasty mediums. The path between the valve entry and the valve exit is heavily curved and the valve chamber comprises large hollow cavities. This geometry has a negative effect on the flow behavior of pasty mediums and makes the exact metering difficult.

In particular, with delivery of mediums which do not keep for too long a time such as for example printing inks, it must be avoided that the medium, on account of its high viscosity, gets stuck in the hollow cavities and does not flow away by itself.

It is the object of the present invention to avoid the known disadvantages, thus in particular to provide a metering valve and a method for the delivery of preferably pasty mediums, which with high maximum discharge rates, permits a precise metering, even of small quantities. A further object of the invention lies in providing a metering valve and a method for the metered delivery of mediums, with which the preferably pasty mediums have a small period of stay in the valve and do not get stuck in dead spaces. A further object of the invention consists of providing a metering valve and a method for the metered delivery of mediums, which can be manufactured or carried out simply and economically and whose valve comprises as little as possible moving parts and which may be simply cleaned.

According to this invention, a metering valve for the delivery of preferably pasty mediums comprises essentially a valve housing and a flow restrictor. The valve housing is provided with an inlet opening and an outlet opening. The inlet opening is for example connected to a storage container of the medium and the outlet opening may open into a smaller container. The valve according to the invention may be applied particularly well in an arrangement for mixing different fluids, with which each fluid is delivered in a metered manner into a common container by way of a valve. One advantageous purpose of application may be the manufacture of printing ink from various base colours. The flow restrictor is movably arranged in the valve housing between the inlet and outlet opening. The flow restrictor is also provided with at least one hole for forming a connection between the inlet opening and the outlet opening. For opening the valve, the flow restrictor may be moved into a position in which the hole connects the inlet opening to the outlet opening. For closing the valve, the flow restrictor is moved away from this position so that the inlet opening is in connection with the surface of the flow restrictor and there is no connection between the inlet opening and the outlet opening.

According to the idea of the invention, the hole may be intermittently positioned between the inlet opening and the outlet opening. This means that the connection between the inlet opening and the outlet opening exists only for a while. When the hole oscillates between a closed position and a completely opened position, thus intermittently positioned between the inlet and outlet opening, the flow of the medium is reduced per unit of time. The hole of the oscillating flow restrictor then comprises an effective cross-section which is smaller than the geometric cross-section which determines the flow quantity with a static flow restrictor. The quicker the flow restrictor oscillates, the smaller becomes the discharge quantity. At the same time, the tougher/more viscous the medium is, the smaller becomes the discharge quantity with an oscillating flow restrictor. The new metering valve or the method for delivery of a medium is thus particularly suitable when applied in connection with pasty or higher viscous mediums.

The valve according to the invention can be particularly well applied when there is a high pressure drop between the inlet opening and the outlet opening, for example when a vaccuum is applied in the region of the outlet opening. With such arrangements, the medium is sucked through the hole, whereby the suction effect is only effective with an oscillating flow restrictor in given time intervals.

In a particularly advantageous embodiment the metering valve is provided with a flow restrictor which comprises two holes. A first hole has a larger cross-section than the second hole. Such an arrangement makes possible an even more exact metering, i.e. a yet further difference between the minimum and maximum discharge quantity. In a first metering phase, the first hole, and in a second metering phase, the second hole may be positioned between the inlet opening and the outlet opening. The first and second hole can again each be intermittently positioned between the inlet opening and the outlet opening.

In the first metering phase, the connection between the inlet opening and the outlet opening is made by way of the first hole in the non-moving flow restrictor. The whole cross-section of the first hole may therefore be used for the transport of material. In a second part of the first metering phase, the effective cross-section of the first hole is reduced by oscillation of the flow restrictor. Since with an increasing frequency, the metering accuracy may be reduced and a high oscillation frequency may lead to mechanically complicated valves, limits are placed on the minimal discharge quantity through the first hole also in the oscillating mode. As soon as these limits are achieved, the flow restrictor is moved into a position in which the second hole lies between the inlet opening and the outlet opening. The effective cross-section of the second hole may likewise be reduced by oscillation of the flow restrictor.

The oscillation of the flow restrictor is a pendulous movement of the flow restrictor. The position of the flow restrictor, in which the first hole (or the second hole) is positioned between the inlet opening and the outlet opening, defines the zero point of the pendulous movement. The maximum amplitudes of the pendulous movement are so chosen that the second hole (or the first hole) does not come into discharge contact with the inlet or the outlet opening.

In an advantageous embodiment, the flow restrictor is formed as a spherical body which is rotatably mounted about a rotational axis in the valve housing. The oscillation of the flow restrictor in this case consists of a rotational movement with a certain rotational angle as the maximum deviation. In this case both holes advantageously run perpendicularly to the rotational axis and are arranged at a distance to one another. The distance between both holes must be chosen so that the holes are formed as channels which are closed per se and which are not connected to one another. The holes are advantageously arranged twisted to one another about an angle of 60° to 65°.

It is however also conceivable, instead of a spherical body, to use a body which is mounted linearly displaceable in the valve body, preferably a cylinder. The cylinder in this case comprises one or more holes running perpendicularly to the direction of displacement. In the case of several holes, these holes are arranged parallel to one another at a distance.

An advantageously large range of discharge quantities may be achieved when the cross-section of the first hole is 10 to 15%, preferably 14% of that of the second hole.

It is of course also conceivable to use, instead of a ball, a rotatably mounted cylinder or another flow restrictor which is symmetric to an axis.

In the method, according to the invention, for the metered delivery of preferably pasty mediums, a metering valve as previously described is employed. In a first static metering phase, a first hole of the flow restrictor of the valve is positioned between the inlet opening and the outlet opening of the valve. In this connection, static is to be understood in that during the first phase, the position of the hole remains unchanged in relation to the inlet and outlet opening. In a second dynamic metering phase, the hole is positioned intermittently between the inlet and outlet opening. In this connection, dynamic is to be understood in that the hole is moved to and fro between a position in which it is not connected to the inlet and outlet opening, and a position in which the hole is connected to the outlet opening and the inlet opening. Due to this intermittent movement, the connection, made by the hole, between the inlet opening and the outlet opening exists only in certain time intervals. The actual effective cross-section of the hole is thus reduced in comparison to the geometric cross-section. Effective cross-section it is to be understood as that cross-section which given the same peripheral conditions (equal pressures, equal viscosities, temperatures) with a static connection would lead to the same flow rates. The ratio between the effective cross-section and the effective geometric cross-section corresponds roughly to the portion of time during which the hole forms a connection between the inlet opening and the outlet opening. The exact effective cross-section may however not be exactly calculated since on the one hand the bore in the intermediate phases is only partly connected to the inlet or outlet openings and because the inertia of the highly viscous mediums must be taken into account.

In a particularly advantageous method, the metering is carried out in essentially four metering phases. In a first metering phase a maximum flow of the medium is led through the metering valve. The first metering phase serves the quick filling up of a container up to the point in time when the container is to a large extent filled, for example about 90%. During the first, static metering phase, a first hole forms a permanent connection between the inlet opening and the outlet opening. In a dynamic metering phase, the first hole, as previously described, is intermittently positioned between the inlet opening and the outlet opening. In this way the effective cross-section in the dynamic metering phase is reduced in comparison to the first static metering phase. The hole is positioned during the first static and the first dynamic metering phase. After the end of the first dynamic metering phase the second hole with a smaller cross-section is applied. In a second static metering phase the second hole forms a firm connection between the inlet opening and the outlet opening. The effective cross-section corresponds to the geometric cross-section of the second hole. The cross-section of the second hole is smaller than the effective cross-section of the first hole at the end of the first dynamic metering phase. After completion of the second static metering phase the effective cross-section of the second hole in a second dynamic metering phase is further reduced.

For the continuous reduction of the discharge, the oscillation frequency in the dynamic phases during the course of the whole phase is not always the same amount. Advantageously, the oscillation at the beginning of the dynamic phases is roughly 0,5 to 0,3 , preferably 0,4 Hz and at the end of the dynamic phase 0,2 to 0,4, preferably 0,2 Hz.

In a further advantageous embodiment example, it is also conceivable to pause the flow restrictor for a given time at the point of maximum amplitude. Maximum amplitude is to be understood as that position in which the direction of movement of the flow restrictor changes—i.e. that position in which the hole is furthest from the zero position. Zero position is to be understood as that position in which the hole is positioned between the inlet opening and the outlet opening.

The time during which the flow restrictor is stopped at the point of maximum amplitude is, at the beginning of the dynamic phases 0 to 3 sec and at the end of the dynamic phases 0 to 5 sec.

With the method according to the invention, which permits different metering quantities in four metering phases, typically, exactly metered material flows of 100 cm3/sec to 0,5 cm3/sec may be achieved.

It is of course also conceivable to extend this range by using more than two holes with a differing cross-section, for example three or more holes. The metering procedure is accordingly divided into a larger number of static and dynamic metering phases.

Figure 2:
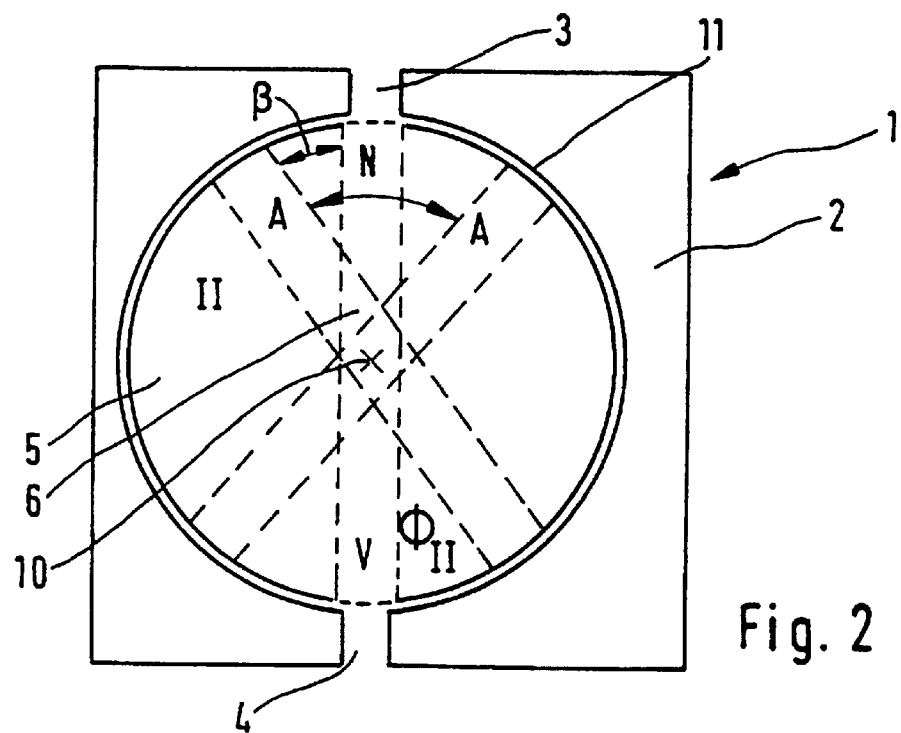
Figure 3:
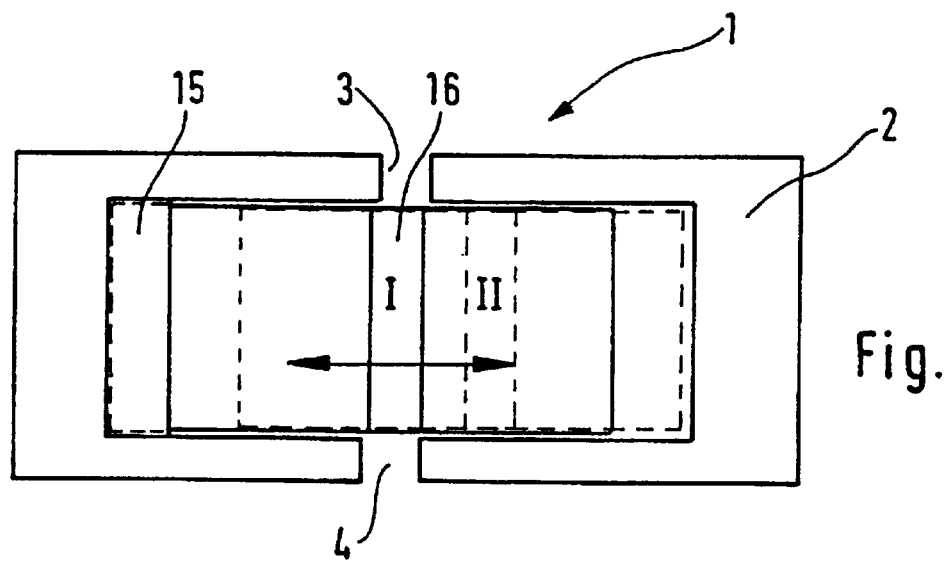
Figure 4A:
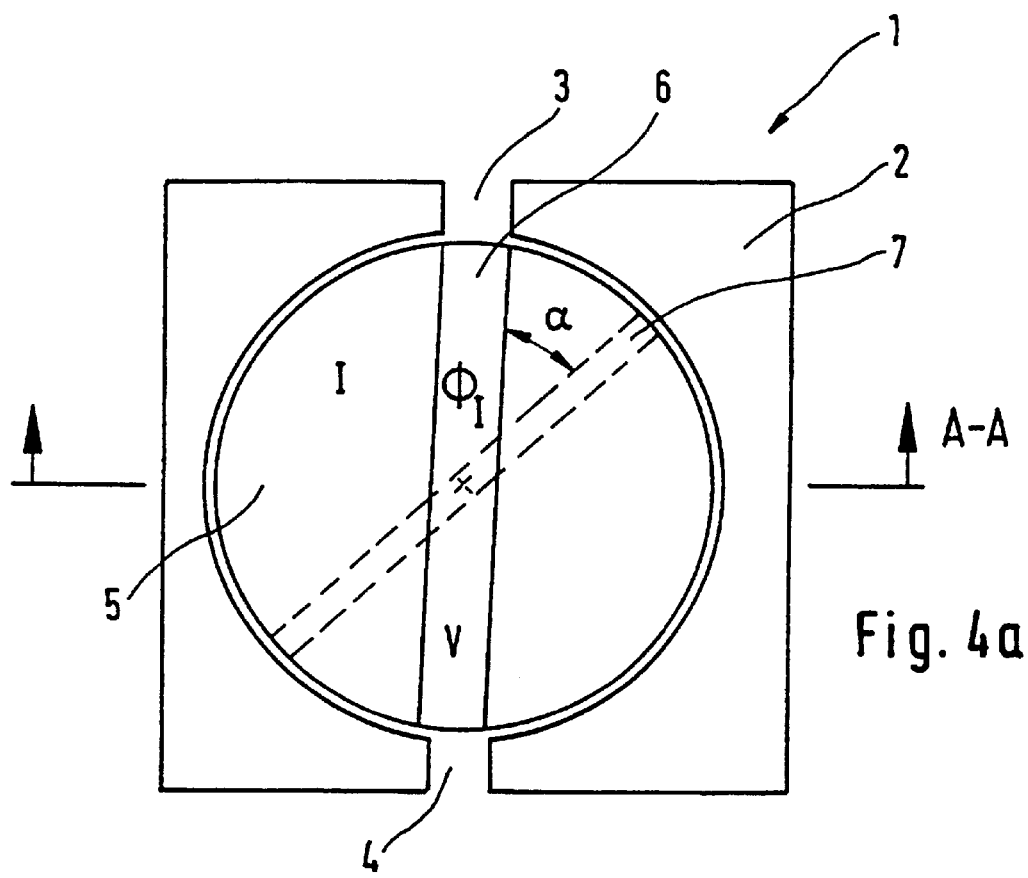
Figure 4B:
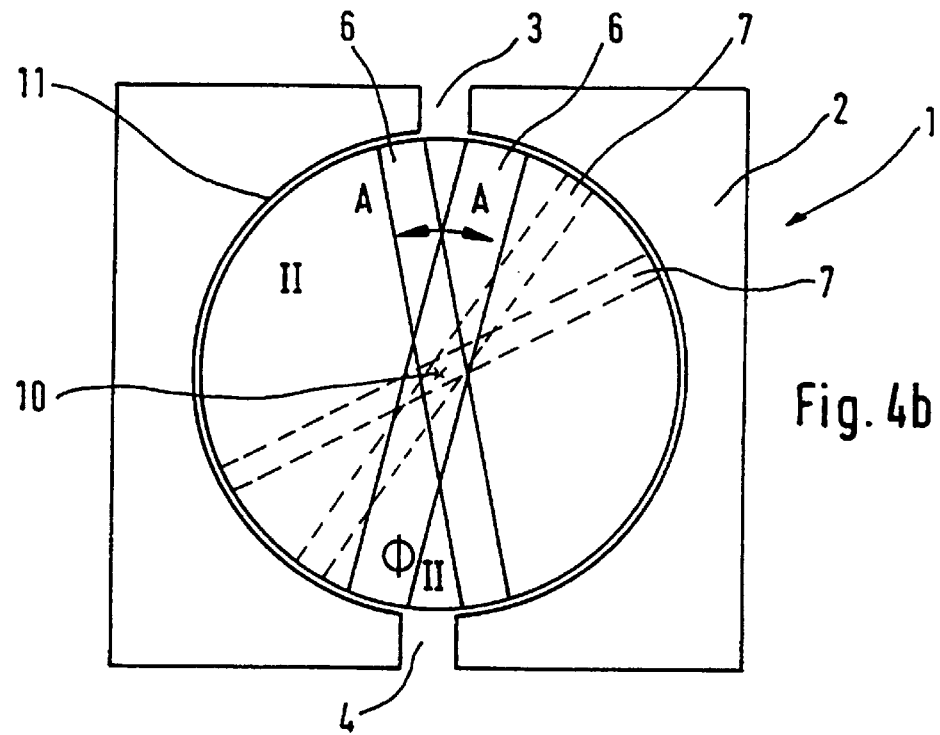
Figure 4C:
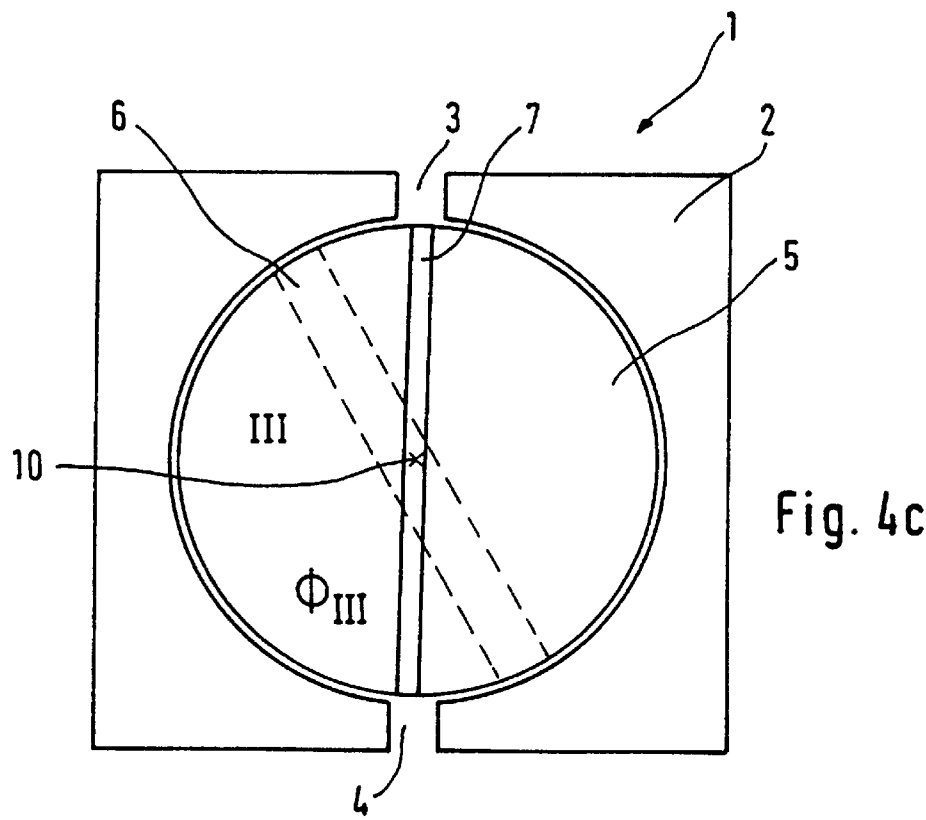
Figure 4D:
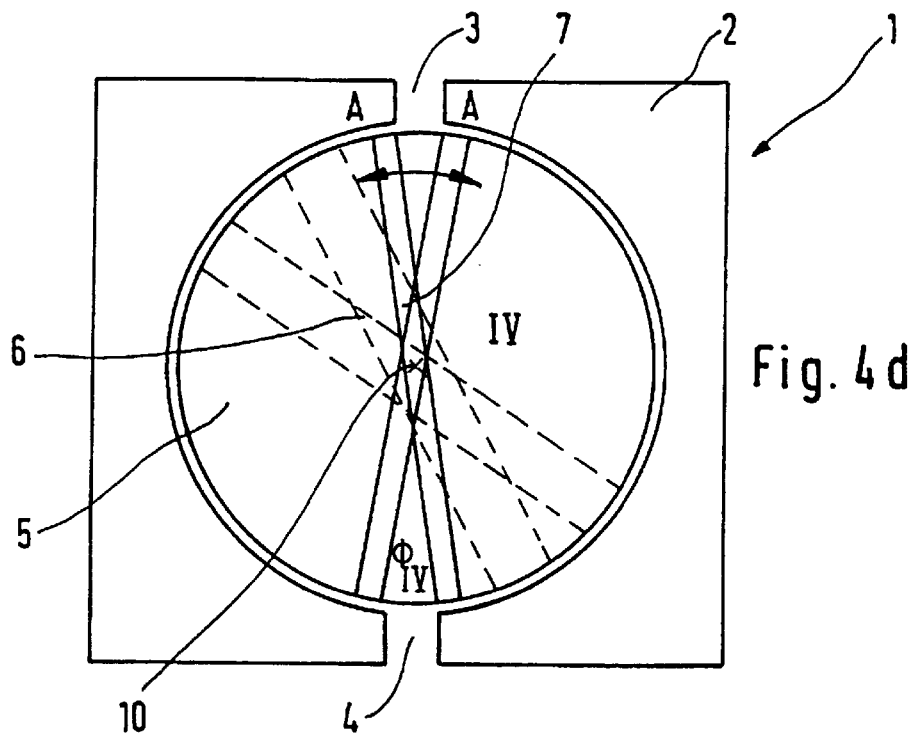
Figure 4E:
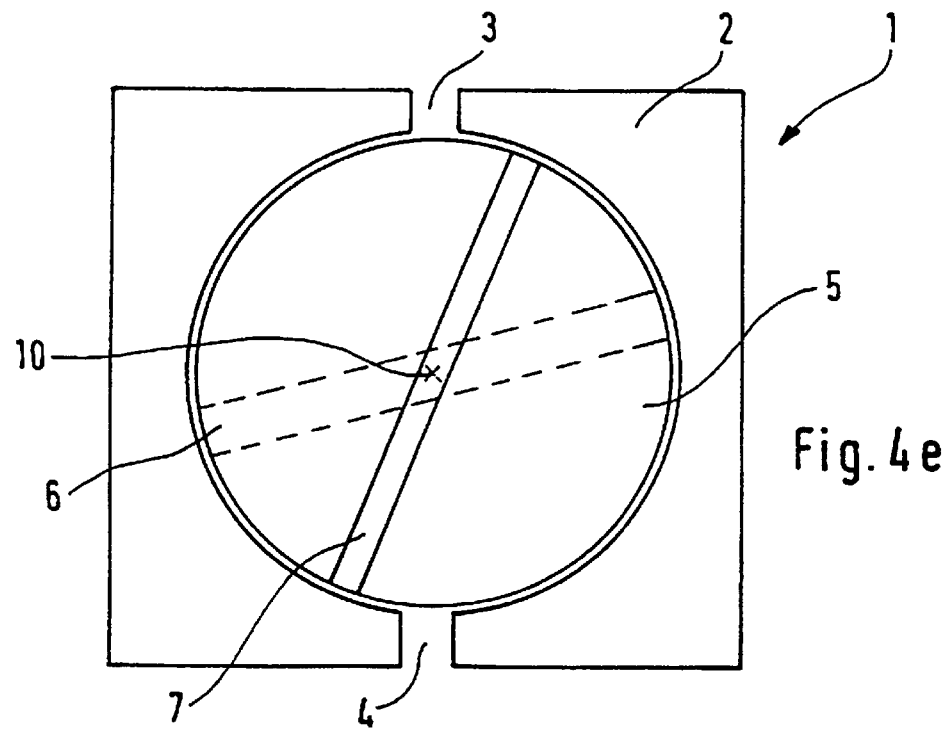
Figure 5:
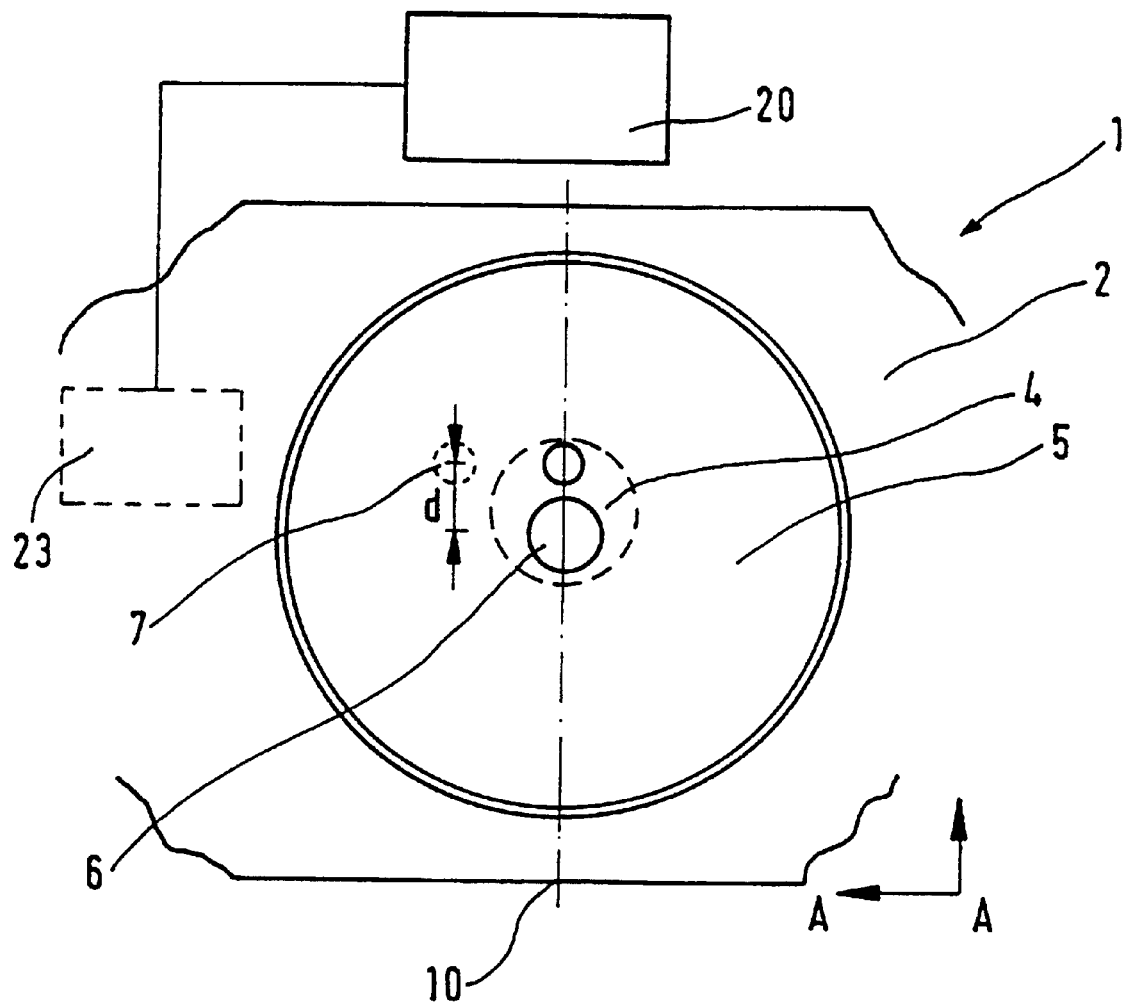

The invention is hereinafter described in more detail by way of embodiment examples and the drawings. There are shown:

FIG. 1 the schematic representation of a cross-section through the metering valve according to the invention in a static condition, FIG. 2 the metering valve of FIG. 1 in a dynamic condition, FIG. 3 an alternative embodiment of a metering valve according to the invention, FIGS. 4a to 4e a metering valve according to the invention with two holes in different metering phases, FIG. 5 a cross-section of the metering valve according to FIG. 4a in the plane A—A.

FIG. 1 schematically shows, in cross-section, a metering valve 1 according to the invention. The metering valve 1 consists essentially of a valve housing 2 and a flow restrictor 5. The flow restrictor 5 is positioned between an inlet opening 3 and an outlet opening 4 of the valve housing 2. The flow restrictor 5 is rotatably mounted about an axis 10 in the housing 2. The flow restrictor 5 is provided with a hole 6 which with a corresponding rotation of the flow restrictor 5 is positioned between the inlet opening 3 and the outlet opening 4. In the situation represented in FIG. 1, the flow restrictor is located in a static metering phase I, in which a uniform connection V is formed between the inlet opening 3 and the outlet opening 4. A medium M contained in a supply opening 21 may be metered through the connection V into a container 22.

FIG. 2 shows the metering valve according to the invention in a dynamic metering phase II. The flow restrictor 5 is in an oscillating rotational movement about the rotational axis 10. The hole 6 of the flow restrictor 5 moves about a zero position N between two positions with a maximum amplitude A. The positions with a maximum amplitude A define that position in which the hole 6 has a maximum distance from the zero position N. Zero position N is the one position in which the hole 6 forms a connection between the inlet opening 3 and the outlet opening 4. The maximum deviation of the hole is 90°, measured from the zero position. This angle β is dependent particularly on the size of the inlet opening 3 and the outlet opening 4 as well as the cross-section of the hole 6. Generally the maximum deviation angle is chosen such that in the position of maximum amplitude A, the hole 6 is completely closed by the inner surface 11 of the housing 2, so that no passage of the medium from the inlet opening 3 to the outlet opening 4 is possible. The cross-section $\Phi_I$ of the hole 6, available for the discharge of the medium M, corresponds in FIG. 1 to the geometric cross-section of the hole 6. In the situation shown in FIG. 2, the effective cross-section $\Phi_{II}$ which is available, is smaller than the geometric cross-section of the hole 6.

FIG. 3 shows an alternative embodiment of a metering valve according to the invention. As a flow restrictor, a displaceable cylinder 15 is arranged in the valve housing 2. The cylinder comprises a hole 16 which in a static metering phase I connects the inlet opening 3 to the outlet opening 4. In a dynamic metering phase II, the hole 16 oscillates between two positions of a maximum distance (in FIG. 3 shown dashed).

FIGS. 4a to 4e show a metering valve 1 according to the invention having two holes 6, 7, in situations of different discharge quantities. In FIG. 4a a maximum discharge quantity is achieved and in FIG. 4e the valve is closed.

In the situation shown in FIG. 4a, the flow restrictor 5 in the housing 2 of a valve 1 is in a first static metering phase I. The flow restrictor 5 connects the inlet opening 3 to the outlet opening 4 in a connection V. The effective cross-section of the hole 6 for the discharge of material from the inlet opening 3 to the outlet opening 4 is $\Phi_I$. For reducing the discharge quantity, the flow restrictor 5 is displaced, in a first dynamic metering phase II, in an oscillating motion about a rotational axis 10 (see FIG. 4b). The hole 6 moves to and fro between two positions A of maximum amplitude at which the hole 6 is covered by the inner surface 11 of the valve housing 2. At the beginning of this dynamic metering phase II, the oscillating frequency is 0 Hz. During this first dynamic metering phase the oscillating frequency is continuously increased until at the end it is 0,2 Hz. Due to the oscillation, the effective cross-section $\Phi_{II}$ at the end of the first dynamic metering phase is 20% of the geometric cross-section of the hole 6.

The flow restrictor 5 of the embodiment shown in FIG. 4a to FIG. 4e is also provided with a second hole 7. The cross-section $\Phi_{III}$ of the second hole is smaller than the cross-section $\Phi_I$ of the first hole 6. In the second static metering phase III shown in FIG. 4c, the second hole 7 is positioned as a connection between the inlet opening 3 and the outlet opening 4. For this, the flow restrictor 5 must be correspondingly rotated about the rotational axis 10. In the second static metering phase III shown in FIG. 4c, the effective cross-section for the passage of the medium corresponds to the geometric cross-section $\Phi_{III}$ of the hole 7.

The first hole 6 and the second hole 7 are both arranged perpendicularly to the rotational axis 10 but mutually at a distance to one another. Both holes are furthermore twisted about an angle α to one another. The mutual distance must be chosen such that both the holes 6, 7 are closed per se and that there is no connection to one another. The angle α must be chosen such that in each case, only either the first hole 6 or the second hole 7 permits a connection between the inlet opening 3 and the outlet opening 4.

In FIG. 4d the metering valve 1 according to the invention is shown in a second dynamic metering phase. The flow restrictor 5 oscillates such that the second hole 7 moves to and fro between two positions of a maximum amplitude A. The oscillating movement leads to an effective cross-section $\Phi_{IV}$ which is smaller than the geometric cross-section $\Phi_{III}$ of the second hole 7. By continuously increasing the oscillating frequency during the second dynamic metering procedure IV, the discharge quantity for the medium between the inlet opening 3 and the outlet opening 4 can be continuously reduced.

FIG. 4e shows the metering valve 1 according to the invention in the closed position. The inlet opening 3 is completely separated from the outlet opening 4. The flow restrictor 5 is, in comparison to the previously described positions, rotated about the rotational axis 13 such that none of the openings 6, 7 are in connection with the inlet or outlet opening.

In the sequence shown from FIG. 4a to FIG. 4e, the discharge for the medium M is continuously reduced. The discharge at the end of the second dynamic metering phase IV is only ~15% of the discharge shown in FIG. 4a. These values are achieved with a metering valve having the following dimensions:

| | |
|---|---|
| cross-section of the first hole: | 132 mm2 |
| cross-section of the second hole: | 20 mm2 |
| angle between both holes: | 63° |
| length of the holes: | 5 cm |
| cross-section of the inlet opening/and the outlet opening: | 19.5/1.75 cm2 |
| minimum oscillating frequency at the beginning of the first dynamic metering phase: | 0.2 |
| maximum oscillating frequency at the end of the first dynamic metering phase: | 0.4 |
| minimum oscillating frequency at the beginning of the second dynamic metering phase: | 0.2 |
| maximum oscillating frequency at the end of the second dynamic metering phase: | 0.4 |
| viscosity of the applied medium: | ~8 Pa.s at 40° C. |

Other geometries or other fluid mediums require, where appropriate, adaptations of the geometry or of the oscillating frequencies for achieving equivalent results. The appropriate values may be determined empirically.

FIG. 5 shows a cross-section taken along plane A—A through the metering valve 1 according to the invention, in the position shown in FIG. 4a. As can be deduced from FIG. 5, both holes 6, 7 are arranged at a distance d from one another, so that the holes 6, 7 do not make contact. In the situation shown in FIG. 5, the first hole 6 is in connection with the inlet opening and the schematically represented outlet opening 4. The second hole 7 lies about an angle twisted to the first hole 6 and is not in connection with the inlet opening or the outlet opening. In the valve housing 2, the flow restrictor 5 is rotatably mounted about a rotational axis 10. The rotation is produced by a schematically represented drive 20. The drive 20 produces an oscillating movement of the flow restrictor 5. The drive 20 allows an oscillating movement about a zero point N defined by the large hole 6 and the small hole 7. Furthermore the drive 20 permits a non-oscillatory rotation of the flow restrictor 5 between the individual situations represented in FIGS. 4a to 4e.

The drive 20 may furthermore cooperate with a measuring arrangement in the container 22 shown in FIG. 1. The measuring arrangement 23, which is shown only schematically, measures the level of the medium M in the container 22 and regulates the drive 20. On reaching a certain level, the discharge quantity through the metering valve 1 is reduced on operation of the drive 20 in each case.

What is claimed is:

1. A metering valve (1) for the delivery of a medium (M), said valve comprising a valve housing (2) with an inlet opening (3) and an outlet opening (4) and with a flow restrictor (5, 15) movably arranged between the inlet opening (3) and the outlet opening (4), wherein the flow restrictor (5, 15) has a first hole and a second hole for forming a connection (V) between the inlet opening (3) and the outlet opening (4), and said first hole (6) has a larger cross-section ($\Phi_1$) than said second hole (7), whereby in a first metering phase (I, II) the first hole (6), and in a second metering phase (III, IV) the second hole (7), can be intermittently placed in a first position connecting the inlet opening and the outlet opening and in a second position where the first hole is closed by an inner surface of said housing.

2. A metering valve according to claim 1, characterised in that the flow restrictor is a spherical body (5) which is rotatably mounted about a rotational axis (10) in the valve housing (2).

3. A metering valve according to claim 2, characterised in that the holes (6, 7) are arranged at a distance to one another and run perpendicularly to the rotational axis (10), and that the holes (6, 7) are arranged twisted to one another about an angle ($\alpha$) of 60° to 65°.

4. A metering valve according to claim 1, characterised in that the flow restrictor is a body displaceably mounted in the valve housing (2), preferably a cylinder (15), which comprises two holes (16, 17) arranged at a distance and parallel to one another.

5. A metering valve according to claim 2, characterised in that the cross-section ($\Phi_I$) of the first hole (6) is 10% to 15%, preferably 14% of the cross-section ($\Phi_{III}$) of the second hole.

6. A method for the metered delivery of a medium (M) with a metering valve (1) having a valve housing (2) with an inlet opening (3) and an outlet opening (4) and with a flow restrictor (5, 15) movably arranged between the inlet opening (3) and the outlet opening (4) and having a first hole and a second hole for forming a connection (V) between the inlet opening (3) and the outlet opening (4) and said first hole (6) has a larger cross-section ($\Phi_1$) than said second hole (7), said method comprising steps of in a static metering phase (I), positioning the first hole (6) between the inlet opening (3) and the outlet opening (4), and in a dynamic metering phase (II), intermittently moving the first hole (6) between a first position connecting the inlet opening and the outlet opening and in a second position where the first hole is closed by an inner surface of said housing by oscillating the flow restrictor at an oscillating frequency, thereby producing a variably reduced effective cross-section ($\Phi_{II}$), with respect to the cross-section ($\Phi_I$) of the first hole (6).

7. A method according to claim 6, characterised in that the flow restrictor (5) oscillated with a frequency of 0,5 Hz at the beginning of the dynamic phase (II, IV) to 0,2 Hz at the end of the dynamic phase (II, IV).

8. A method according to claim 7, characterised in that the flow restrictor (5) is kept at the point of maximum amplitude (A) during 0 to 5 sec at the end of the dynamic metering phase.

9. A method according to claim 6, wherein the oscillating frequency is changed for controlling the discharge quantity.

* * * * *